United States Patent
Hong

(10) Patent No.: US 11,218,940 B2
(45) Date of Patent: Jan. 4, 2022

(54) CELL RESELECTION METHOD AND DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/772,153

(22) PCT Filed: Dec. 11, 2017

(86) PCT No.: PCT/CN2017/115500
§ 371 (c)(1),
(2) Date: Jun. 11, 2020

(87) PCT Pub. No.: WO2019/113755
PCT Pub. Date: Jun. 20, 2019

(65) Prior Publication Data
US 2021/0076290 A1   Mar. 11, 2021

(51) Int. Cl.
*H04W 4/00* (2018.01)
*H04W 36/32* (2009.01)
(Continued)

(52) U.S. Cl.
CPC ..... *H04W 36/32* (2013.01); *H04W 36/00837* (2018.08); *H04W 36/08* (2013.01); *H04W 36/30* (2013.01)

(58) Field of Classification Search
CPC .......... H04W 36/32; H04W 36/00837; H04W 36/08; H04W 36/30
(Continued)

(56) References Cited

U.S. PATENT DOCUMENTS 8,738,008 B2 * 5/2014 Wu ................. H04W 36/00837
455/442
8,934,869 B2   1/2015 Edara et al.
(Continued)

FOREIGN PATENT DOCUMENTS

CN   101553013 A   10/2009
CN   101998555 A   3/2011
(Continued)

OTHER PUBLICATIONS

First Office Action of Chinese Application No. 201780001978.1 dated Sep. 8, 2020 with English translation, (33p).
(Continued)

*Primary Examiner* — Amancio Gonzalez
(74) *Attorney, Agent, or Firm* — Arch & Lake LLP

(57) ABSTRACT

The present disclosure relates to a cell reselection method and device, and a storage medium in the field of communication technology. The cell reselection method includes: a terminal acquires cell reselection parameters carried in a system message of a target cell. Since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed.

18 Claims, 4 Drawing Sheets

---

Acquiring cell reselection parameters carried in a system message of a target cell, the cell reselection parameters being set according to terminal speeds, the target cell being a serving cell or at least one neighbor cell — 101

Determining the signal quality of the target cell according to the cell reselection parameters — 102

Determining the signal quality of other cells than the target cell in the serving cell and the at least one neighbor cell — 103

Selecting, according to the signal quality of the target cell and the signal quality of other cells, one cell from the serving cell and the at least one neighbor cell for residence — 104

(51) Int. Cl.
*H04W 36/00* (2009.01)
*H04W 36/08* (2009.01)
*H04W 36/30* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 9,313,703 | B2* | 4/2016 | Lin | H04W 36/00835 |
| 10,524,174 | B2* | 12/2019 | Li | H04W 28/00 |
| 10,681,629 | B2* | 6/2020 | Fujishiro | H04W 24/10 |
| 2014/0194117 | A1* | 7/2014 | Jeong | H04W 48/20 |
| | | | | 455/434 |
| 2015/0141013 | A1* | 5/2015 | Cui | H04W 48/20 |
| | | | | 455/436 |
| 2016/0057666 | A1 | 2/2016 | Pang et al. | |
| 2017/0150410 | A1 | 5/2017 | Yang et al. | |
| 2019/0357112 | A1* | 11/2019 | Shen | H04W 36/30 |

FOREIGN PATENT DOCUMENTS

| | | |
|---|---|---|
| CN | 202425053 U | 9/2012 |
| CN | 104620633 A | 5/2015 |
| CN | 104956730 A | 9/2015 |
| CN | 105007606 A | 10/2015 |
| WO | 2013025034 A3 | 4/2013 |
| WO | 2013067676 A1 | 5/2013 |
| WO | 2014101184 A1 | 7/2014 |

OTHER PUBLICATIONS

The International Search Report of PCT Application No. PCT/CN2017/115500 dated Apr. 17, 2018, (4p).

Notification to grant patent right for invention of Chinese Application No. 201780001978.1 dated Jun. 2, 2021, with English translation, (6p).

* cited by examiner

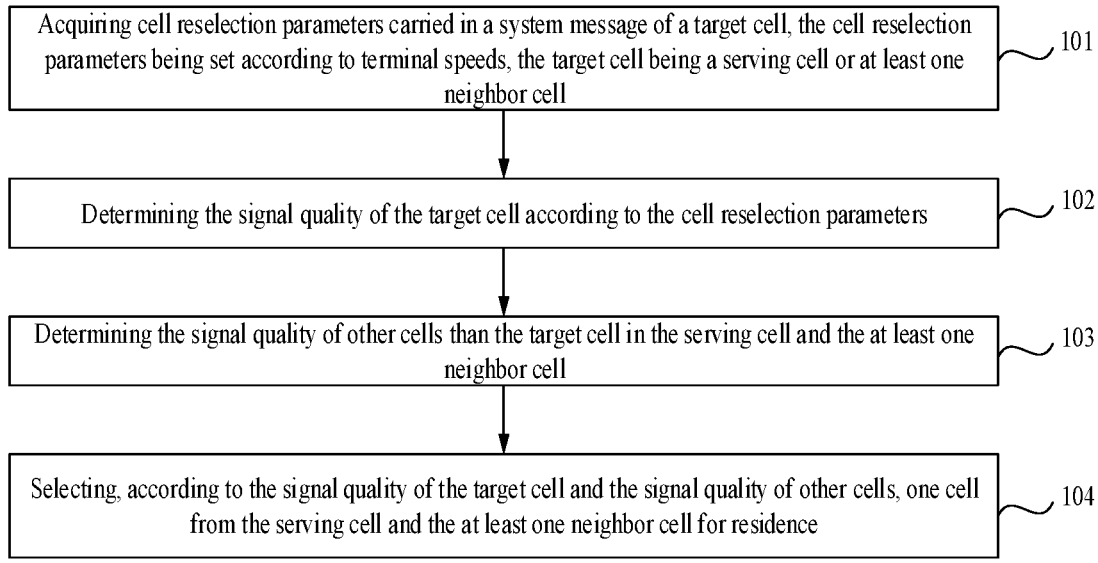
FIG. 1
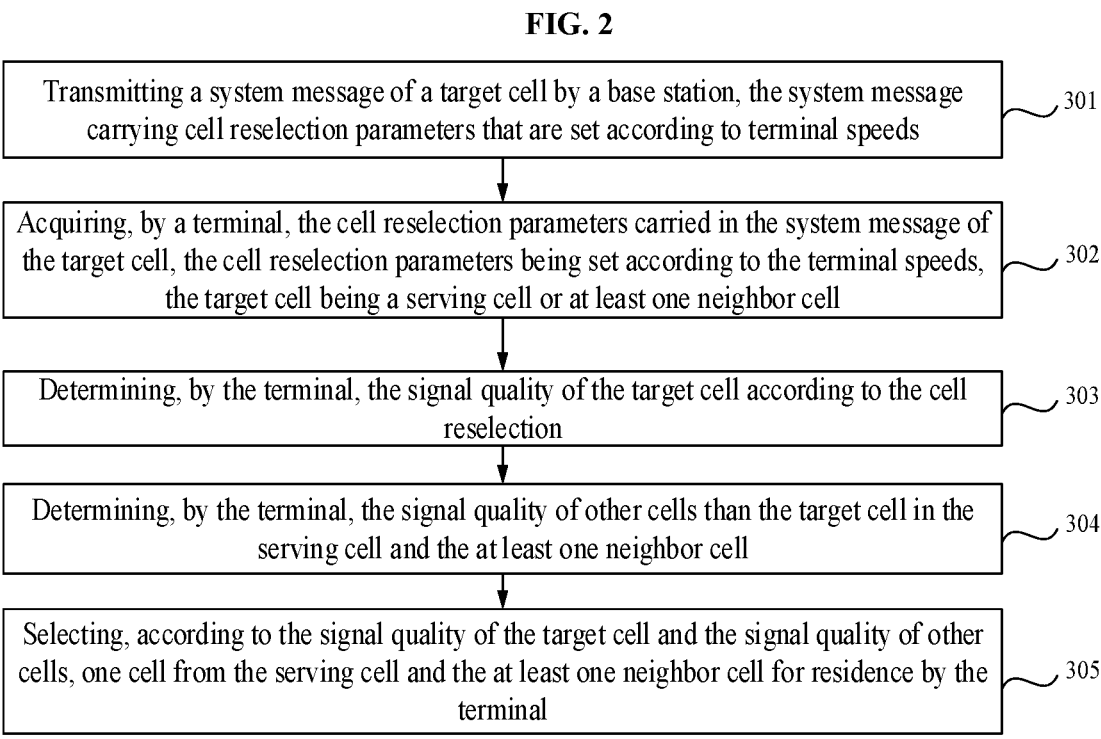
FIG. 2
FIG. 3

CELL RESELECTION METHOD AND DEVICE, AND STORAGE MEDIUM

CROSS-REFERENCE TO RELATED APPLICATIONS

This application is a national phase application based on PCT/CN2017/115500, filed on Dec. 11, 2017, the content of which is incorporated herein by reference.

TECHNICAL FIELD

The present disclosure relates to the field of communication technology, and in particular to a cell reselection method and device, and a storage medium.

BACKGROUND

Currently, to keep a terminal residing in a suitable cell to the greatest extent, the terminal will carry out cell reselection after residing in a certain cell for an appropriate period of time, for example, 1 s. The terminals carry out an intra-frequency cell reselection process when a serving cell and a neighbor cell where the terminals are currently located correspond to the same frequency.

In the related art, the terminal implements the intra-frequency cell reselection process according to an R criterion. That is, the terminal ranks the signal quality of the serving cell and the signal quality of the neighbor cell according to the R criterion, and selects a cell with the best signal quality therefrom for residence. The R criterion has the following formulas:

$$R_s = Q_{meas,s} + Q_{Hyst} - Q_{offset_{temp}} + Q_{offset_{SCPTM}}$$

$$R_n = Q_{meas,n} - Q_{offset} - Q_{offset_{temp}} + Q_{offset_{SCPTM}}$$

$R_s$ represents the signal quality of the serving cell. $Q_{meas,s}$ represents the signal quality of a reference signal of the serving cell. $Q_{Hyst}$ is a cell reselection hysteresis value that is set to prevent the terminal from frequently carrying out ping-pong reselection in two cells close to each other. $R_n$ represents the signal quality of the neighbor cell. $Q_{meas,n}$ represents the signal quality of a reference signal of the neighbor cell. $Q_{offset}$ represents a cell reselection offset value within a frequency defined in a protocol. In addition, $Q_{offset_{temp}}$ and $Q_{offset_{SCPTM}}$ represent the temporary signal quality defined in the protocol and the reference signal quality in the single-cell point-to-multipoint (SCPTM) technology. $Q_{Hyst}$ and $Q_{offset}$ can be obtained from a system message of the serving cell and a system message of the neighbor cell.

SUMMARY

To solve problems in the related art, the present disclosure provides a cell reselection method and device, and a storage medium.

According to a first aspect of the present disclosure, a cell reselection method is provided. The method is for applying to a terminal and includes:

acquiring one or more cell reselection parameters carried in a system message of a target cell, wherein the one or more cell reselection parameters are set according to speed of the terminal and the target cell is one cell of a plurality of cells comprising a serving cell and at least one neighbor cell;

determining signal quality of the target cell according to the one or more cell reselection parameters;

determining signal quality of other cells than the target cell in the plurality of cells; and selecting, according to the signal quality of the target cell and the signal quality of other cells, one cell from the plurality of cells for residence.

According to a second aspect of the present disclosure, a terminal is provided. The terminal comprises:

one or more processors; and a non-transitory storage coupled to the one or more processors; and a plurality of programs stored in the non-transitory storage that, when executed by the one or more processors, cause the terminal to perform acts comprising:

acquiring one or more cell reselection parameters carried in a system message of a target cell, wherein the one or more cell reselection parameters are set according to speed of the terminal and the target cell one cell of a plurality of cells comprising a serving cell and at least one neighbor cell;

determining signal quality of the target cell according to the one or more cell reselection parameters;

determining signal quality of other cells than the target cell in the plurality of cells; and selecting, according to the signal quality of the target cell and the signal quality of other cells, one cell from the plurality of cells for residence.

According to a third aspect of the present disclosure, a base station is provided. The base station comprises:

one or more processors;

a non-transitory storage coupled to the one or more processors; and a plurality of programs stored in the non-transitory storage that, when executed by the one or more processors, cause the base station to perform acts comprising:

transmitting a system message of a target cell, wherein the system message carries one or more cell reselection parameters that are set according to speed of the terminal.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

FIG. 1 is a flow chart of a cell reselection method provided by an embodiment of the present disclosure;

FIG. 2 is a flow chart of another cell reselection method provided by an embodiment of the present disclosure;

FIG. 3 is a flow chart of yet another cell reselection method provided by an embodiment of the present disclosure;

DETAILED DESCRIPTION

Figure 4:
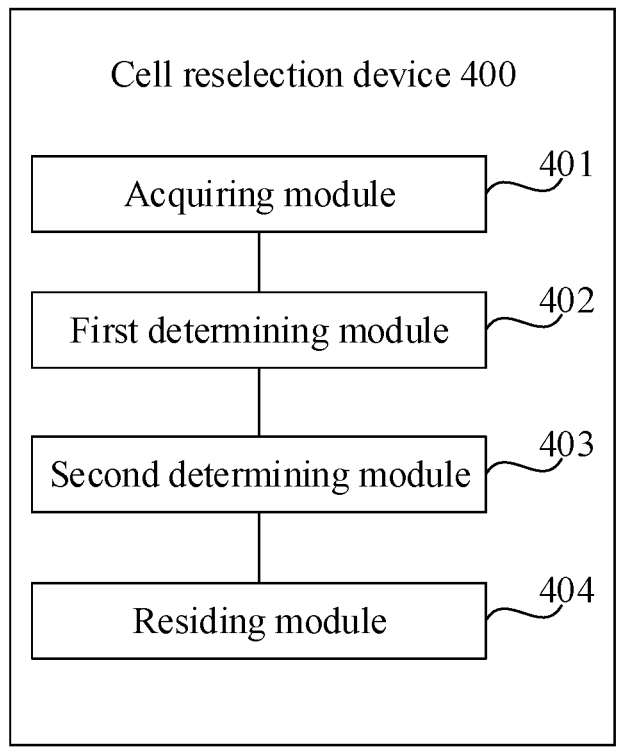
FIG. 4 is a block diagram of a cell reselection device provided by an embodiment of the present disclosure.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the invention/disclosure as recited in the appended claims.

Before explaining the embodiments of the present disclosure in detail, application scenarios of the embodiments of the present disclosure will be described first. In the related art, $Q_{Hyst}$ carried in a system message of a serving cell is fixed no manner whether the serving cell is a cell in a high-speed-railway dedicated network, and $Q_{offset}$ carried in a system message of a neighbor cell is fixed no matter whether the neighbor cell is a cell in the high-speed-railway dedicated network. That is, the probabilities of reselecting two different types of terminals, namely, common terminals and terminals on a high-speed railway, from the serving cell to the neighbor cell are the same, which results in relatively low flexibility in carrying out intra-frequency cell reselection by the terminals.

Therefore, an embodiment of the present disclosure provides a cell reselection method, including: acquiring cell reselection parameters carried in a system message of a target cell. Since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed. Thus, the flexibility in carrying out intra-frequency cell reselection by the terminal is improved.

FIG. 1 is a flow chart of a cell reselection method provided by an embodiment of the present disclosure. The cell reselection method is applied to a terminal, and includes the following steps as shown in FIG. 1.

In step 101, cell reselection parameters carried in a system message of a target cell are acquired and are set according to terminal speeds. The target cell is a serving cell or at least one neighbor cell.

In step 102, the signal quality of the target cell is determined according to the cell reselection parameters.

In step 103, the signal quality of other cells than the target cell in the serving cell and the at least one neighbor cell is determined.

In step 104, one cell is selected, according to the signal quality of the target cell and the signal quality of other cells, from the serving cell and the at least one neighbor cell for residence.

In the present embodiment, the terminal acquires the cell reselection parameters carried in the system message of the target cell. Since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed. Thus, the flexibility in carrying out intra-frequency cell reselection by the terminal is improved.

In one or more embodiments, the target cell is the serving cell and is also a cell in a first network. The cell reselection parameters include an initial cell reselection hysteresis value and a hysteresis value scaling factor. The hysteresis value scaling factor is configured to increase the probability that a terminal of which the speed is higher than a preset speed resides in the first network.

In one or more embodiments, determining the signal quality of the target cell according to the cell reselection parameters includes:
determining the terminal's own movement speed;
adding the initial cell reselection hysteresis value and the hysteresis value scaling factor together to obtain a target cell reselection hysteresis value when the movement speed is higher than a preset speed, and determining the signal quality of the target cell based on the target cell reselection hysteresis value; and
determining the initial cell reselection hysteresis value as the target cell reselection hysteresis value when the movement speed is lower than or equal to the preset speed, and determining the signal quality of the target cell based on the target cell reselection hysteresis value.

In one or more embodiments, the target cell is the serving cell. The cell reselection parameters include an initial cell reselection hysteresis value and at least two hysteresis value scaling factors corresponding to at least two speed intervals. The hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in a first network. The hysteresis value scaling factor corresponding to the speed interval of which the value is greater than the preset speed is smaller than 0 and the hysteresis value scaling factor corresponding to a speed interval of which the value is smaller than the preset speed is greater than 0 when the target cell is a cell in a second network.

In one or more embodiments, determining the signal quality of the target cell according to the cell reselection parameters includes:
determining the terminal's own movement speed;
selecting a speed interval corresponding to the movement speed from the at least two speed intervals to obtain a target speed interval;
selecting a hysteresis value scaling factor corresponding to the target speed interval from the at least two hysteresis value scaling factors;
adding the initial cell reselection hysteresis value and the selected hysteresis value scaling factor together to obtain a target cell reselection hysteresis value; and
determining the signal quality of the target cell based on the target cell reselection hysteresis value.

In one or more embodiments, the target cell is the serving cell. The cell reselection parameters include at least two cell reselection hysteresis values corresponding to at least two speed intervals. Each cell reselection hysteresis value is positively correlated with the value of the corresponding speed interval when the target cell is a cell in a first network. Each cell reselection hysteresis value is negatively correlated with the value of the corresponding speed interval when the target cell is a cell in a second network.

In one or more embodiments, determining the signal quality of the target cell according to the cell reselection parameters includes:
determining the terminal's own movement speed;
selecting a speed interval corresponding to the movement speed from the at least two speed intervals to obtain a target speed interval:
selecting a cell reselection hysteresis value corresponding to the target speed interval from the at least two cell reselection hysteresis values to obtain a target cell reselection hysteresis value; and determining the signal quality of the target cell based on the target cell reselection hysteresis value.

In one or more embodiments, when the target cell is the at least one neighbor cell, acquiring the cell reselection parameters carried in the system message of the target cell includes:

acquiring cell reselection parameters carried in a system message of each neighbor cell to obtain cell reselection parameters of each neighbor cell.

The cell reselection parameters of each neighbor cell include at least two cell reselection offset values corresponding to at least two speed intervals. In the cell reselection parameters of any neighbor cell that is a cell in a first network, each cell reselection offset value is negatively correlated with the value of the corresponding speed interval. In the cell reselection parameters of any neighbor cell that is a cell in a second network, each cell reselection offset value is positively correlated with the value of the corresponding speed interval.

In one or more embodiments, determining the signal quality of the target cell according to the cell reselection parameters includes:

determining the terminal's own movement speed;

selecting a speed interval corresponding to the movement speed from the at least two speed intervals to obtain a target speed interval;

determining, based on the target speed interval, a target cell reselection offset value corresponding to each neighbor cell from at least two cell reselection offset values comprised by cell reselection parameters of each neighbor cell; and determining the signal quality of each neighbor cell based on the target cell reselection offset value corresponding to each neighbor cell.

In one or more embodiments, a frequency corresponding to the serving cell is the same as a frequency corresponding to the at least one neighbor cell.

All the above optional technical solutions may form optional embodiments of the present disclosure in arbitrary combinations thereof, which will not be repeated one by one in the present embodiment.

FIG. 2 is a flow chart of another cell reselection method provided by an embodiment of the present disclosure. The cell reselection method is applied to a base station and includes the following steps as shown in FIG. 2.

In step 201, a system message of a target cell is sent. The system message carries cell reselection parameters that are set according to terminal speeds.

In the present embodiment, since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed. Thus, the flexibility in carrying out intra-frequency cell reselection by the terminal is improved.

In one or more embodiments, the target cell is a cell in a first network. The cell reselection parameters include an initial cell reselection hysteresis value and a hysteresis value scaling factor. The hysteresis value scaling factor is configured to increase the probability that a terminal of which the speed is higher than a preset speed resides in the first network.

In one or more embodiments, the cell reselection parameters include an initial cell reselection hysteresis value and at least two hysteresis value scaling factors corresponding to at least two speed intervals. The hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in a first network. The hysteresis value scaling factor corresponding to the speed interval of which the value is greater than the preset speed is smaller than 0 and the hysteresis value scaling factor corresponding to a speed interval of which the value is smaller than the preset speed is greater than 0 when the target cell is a cell in a second network.

In one or more embodiments, the cell reselection parameters include at least two cell reselection hysteresis values corresponding to at least two speed intervals. Each cell reselection hysteresis value is positively correlated with the value of the corresponding speed interval when the target cell is a cell in a first network. Each cell reselection hysteresis value is negatively correlated with the value of the corresponding speed interval when the target cell is a cell in a second network.

In one or more embodiments, the cell reselection parameters include at least two cell reselection offset values corresponding to at least two speed intervals. Each cell reselection offset value is negatively correlated with the value of the corresponding speed interval when the target cell is a cell in a first network. Each cell reselection offset value is positively correlated with the value of the corresponding speed interval when the target cell is a cell in a second network.

In one or more embodiments, a frequency corresponding to the serving cell is the same as a frequency corresponding to the at least one neighbor cell.

All the above optional technical solutions may form optional embodiments of the present disclosure in arbitrary combinations thereof, which will not be repeated one by one in the present embodiment.

FIG. 3 illustrates yet another cell reselection method provided by an embodiment of the present disclosure. As shown in FIG. 3, the method includes the following steps.

In step 301, a base station transmits a system message of a target cell. The system message carries cell reselection parameters that are set according to terminal speeds.

In the present embodiment, for each cell, the base station periodically broadcasts the system message of the cell, which usually carries some parameters, such as a cell reselection hysteresis value and a cell reselection offset value of the cell.

Further, to improve the flexibility in cell residence of a terminal, the base station can preset the cell reselection parameters for some cells. The cell reselection parameters are set according to terminal speeds to increase the probability that the terminal with a high speed reside in these cells.

The cell reselection parameters preset by the base station for some cells are explained to facilitate subsequent description.

It can be known from the formulas of the R criterion that main parameters which affect whether the terminal chooses to reside on a certain cell include the cell reselection hysteresis value and the cell reselection offset value. Therefore, the present embodiment will provide two different setting modes of the cell reselection parameters. For the ease of description, a cell where the cell reselection parameters are set is called the target cell.

A first setting mode is to set the cell reselection parameters with respect of the cell reselection hysteresis value of the target cell.

In the first setting mode, setting the cell reselection parameters for the target cell may be implemented in the following ways.

Implementation mode (1): the target cell is a cell in a first network; the cell reselection parameters include an initial cell reselection hysteresis value and a hysteresis value scaling factor; and the hysteresis value scaling factor is configured to increase the probability that a terminal of which the speed is higher than a preset speed resides in the first network.

That is, the system message of the cell in the first network carries the cell reselection parameters that include the initial cell reselection hysteresis value and the hysteresis value scaling factor. However, the system messages of cells in other networks only include the cell reselection hysteresis values.

For the purpose that the hysteresis value scaling factor is configured to increase the probability that the terminal of which the speed is higher than the preset speed resides in the first network, the hysteresis value scaling factor is greater than 0.

For example, the first network is a high-speed-railway dedicated network. That is, the system message of the cell in the high-speed-railway dedicated network carries the cell reselection parameters, including the initial cell reselection hysteresis value and the hysteresis value scaling factor. The system message of a cell in a public long-term evolution (LTE) network only carries a cell reselection hysteresis value.

Implementation mode (2): the cell reselection parameters include an initial cell reselection hysteresis value and at least two hysteresis value scaling factors corresponding to at least two speed intervals; the hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in the first network; and the hysteresis value scaling factor corresponding to the speed interval of which the value is greater than the preset speed is smaller than 0 and the hysteresis value scaling factor corresponding to a speed interval of which the value is smaller than the preset speed is greater than 0 when the target cell is a cell in a second network.

That is, in the implementation mode (2), different cell reselection parameters are set for cells in different networks.

For example, the first network is a high-speed-railway network; the second network is a public LTE network; the at least two speed intervals are respectively a first speed interval and a second speed interval; the hysteresis value scaling factor corresponding to the first speed interval is a first hysteresis value scaling factor; and the hysteresis value scaling factor corresponding to the second speed interval is a second hysteresis value scaling factor.

The value of the first speed interval is greater than that of the second speed interval. For example, the first speed interval may be greater than 200 km/h, and the second speed interval may be smaller than 200 km/h.

At this time, for a cell in the high-speed-railway dedicated network, the first hysteresis value scaling factor may be set to 2, and the second hysteresis value scaling factor may be set to −2.

For a cell in the public LTE network, the first hysteresis value scaling factor may be set to −2, and the second hysteresis value scaling factor may be set to 2.

Implementation mode (3): the cell reselection parameters include at least two cell reselection hysteresis values corresponding to at least two speed intervals; each cell reselection hysteresis value is positively correlated with the value of the corresponding speed interval when the target cell is a cell in the first network; and each cell reselection hysteresis value is negatively correlated with the value of the corresponding speed interval when the target cell is a cell in the second network.

That is, in the implementation mode (3), in the at least two cell reselection hysteresis values carried in the system message of a cell of a first network terminal, the greater the value of the speed interval corresponding to the cell reselection hysteresis value is, the greater the cell reselection hysteresis value is.

In the at least two cell reselection hysteresis values carried in the system message of a cell of a second network terminal, the greater the value of the speed interval corresponding to the cell reselection hysteresis value is, the smaller the cell reselection hysteresis value is.

For example, the first network is a high-speed-railway network; the second network is a public LTE network; the at least two cell reselection hysteresis values are respectively a first cell reselection hysteresis value, a second cell reselection hysteresis value and a third cell reselection hysteresis value; and the corresponding speed intervals are respectively a first speed interval, a second speed interval and a third speed interval.

The values of the first speed interval, the second speed interval and the third speed interval are sequentially reduced. For example, the value of the first speed interval is greater than 200 km/h, the value of the second speed interval is 200 to 80 km/h, and the value of the third speed interval is smaller than 80 km/h.

At this time, for a cell of the high-speed-railway dedicated network, the order of the three cell reselection hysteresis values is as follows: the first cell reselection hysteresis value is greater than the second cell reselection hysteresis value, and the second cell reselection hysteresis value is greater than the third cell reselection hysteresis value.

For a cell of the public LTE network, the order of the three cell reselection hysteresis values is as follows: the first cell reselection hysteresis value is smaller than the second cell reselection hysteresis value, and the second cell reselection hysteresis value is smaller than the third cell reselection hysteresis value.

A second setting mode is to set the cell reselection parameters with respect to the cell reselection offset value of the target cell.

In a possible implementation mode, the cell reselection parameters include at least two cell reselection offset values corresponding to at least two speed intervals; each cell reselection offset value is negatively correlated with the value of the corresponding speed interval when the target cell is a cell in the first network; and each cell reselection offset value is positively correlated with the value of the corresponding speed interval when the target cell is a cell in the second network.

That is, in the at least two cell reselection offset values carried in the system message of the cell of the first network terminal, the greater the value of the speed interval corresponding to the cell reselection offset value is, the smaller the cell reselection offset value is.

In the at least two cell reselection offset values carried in the system message of the cell of the second network terminal, the greater the value of the speed interval corresponding to the cell reselection offset value is, the greater the cell reselection offset value is.

For example, the first network is a high-speed-railway dedicated network; the second network is a public LTE network; the at least two cell reselection offset values are respectively a first cell reselection offset value, a second cell reselection offset value and a third cell reselection offset value; and the corresponding speed intervals are a first speed interval, a second speed interval and a third speed interval.

The values of the first speed interval, the second speed interval and the third speed interval are sequentially reduced. For example, the value of the first speed interval is greater than 200 km/h, the value of the second speed interval is 200 to 80 km/h, and the value of the third speed interval is smaller than 80 km/h.

At this time, for a cell of the high-speed-railway dedicated network, the order of the three cell reselection hysteresis values is as follows: the first cell reselection hysteresis value is smaller than the second cell reselection hysteresis value, and the second cell reselection hysteresis value is smaller than the third cell reselection hysteresis value.

For a cell of the public LTE network, the order of the three cell reselection hysteresis values is as follows: the first cell reselection hysteresis value is greater than the second cell reselection hysteresis value, and the second cell reselection hysteresis value is greater than the third cell reselection hysteresis value.

In step 302, a terminal acquires the cell reselection parameters carried in the system message of the target cell. The cell reselection parameters are set according to the terminal speeds. The target cell is a serving cell or at least one neighbor cell.

It can be known from step 301 that in the present embodiment, the cell reselection parameters may be set with respect to the cell reselection hysteresis value or the cell reselection offset value. Therefore, for the terminal, the target cell may be the serving cell or the at least one neighbor cell when the system message of the target cell carries the cell reselection parameters.

That is, the target cell is the serving cell where the terminal is currently located when the base station presets the cell reselection parameters with respect to the cell reselection hysteresis value, and the target cell is the neighbor cell of the serving cell where the terminal is currently located when the base station presets the cell reselection parameters with respect to the cell reselection offset value.

The terminal can directly determine the cell reselection parameters of the target cell from the system message of the serving cell when the target cell is the serving cell.

The terminal needs to determine the cell reselection parameters of each neighbor cell from the system message of each neighbor cell when the target cell is at least one neighbor cell.

It should be noted that the serving cell is a cell to which the terminal is currently accessed, and the neighbor cell is a cell neighboring the serving cell in a network. The neighbor cell of any one cell is planned by an operator through network coverage in advance.

In addition, since the embodiments of the present disclosure are directed to the intra-frequency cell reselection process, a frequency corresponding to the serving cell is the same as a frequency corresponding to the at least one neighbor cell. That is, the serving cell and the at least one neighbor cell are cells corresponding to the same frequency.

In step 303, the terminal determines the signal quality of the target cell according to the cell reselection parameters.

It can be known from step 302 that the target cell may be the serving cell where the terminal is currently located or the neighbor cell of the serving cell. Therefore, step 303 has the following two application scenarios correspondingly.

Scenario I: the target cell is the serving cell. That is, the base station presets the cell reselection parameters with respect to the cell reselection hysteresis value.

It can be known from step 301 that in scenario I, the base station sets the cell reselection parameters in three different ways. The followings will explain step 303 in detail based on these three different implementation modes.

Regarding the implementation mode (1) in step 301, step 303 is implemented in the following way: the terminal determines the terminal's own movement speed; the initial cell reselection hysteresis value and the hysteresis value scaling factor are added together to obtain a target cell reselection hysteresis value when the movement speed is higher than a preset speed; and the signal quality of the target cell is determined based on the target cell reselection hysteresis value.

The initial cell reselection hysteresis value is determined as the target cell reselection hysteresis value when the movement speed is lower than or equal to the preset speed. The signal quality of the target cell is determined based on the target cell reselection hysteresis value.

For example, the serving cell is a cell in a high-speed-railway dedicated network. When the movement speed is higher than the preset speed, it indicates that the terminal is currently located on a high-speed railway. At this time, in order to increase the probability that the terminal resides in the serving cell, the terminal adds together the initial reselection hysteresis value and the hysteresis value scaling factor which are included by the cell reselection parameters, and determines the added value as the target cell reselection hysteresis value.

Correspondingly, when the movement speed is lower than or equal to the preset speed, it indicates that the terminal is currently not located on the high-speed railway. At this time, it is unnecessary to increase the probability that the terminal resides in the serving cell. Then, the terminal directly determines the cell reselection hysteresis value included by the cell reselection parameters as the target cell reselection hysteresis value.

The terminal determines the signal quality of the target cell based on the target cell reselection hysteresis value. That is, the terminal directly takes the target cell reselection hysteresis value as the cell reselection hysteresis value in the formulas of the R criterion and determines the signal quality of the target cell according to the formulas of the R criterion. Therefore, when the terminal is currently located on the high-speed railway, the cell reselection hysteresis value in the R criterion is increased by the hysteresis value scaling factor so as to increase the probability that the terminal on the high-speed railway resides in the cell of the high-speed-railway dedicated network.

The terminal may determine the current movement speed in the following way: the terminal may determine a current position of itself by the global positioning system (GPS) technology every preset time, calculate a movement distance of itself within the preset time based on the determined position, and takes the quotient between the distance and the preset time as the terminal's own movement speed.

In addition, the preset time is a duration set in advance, and it may be 5 s, 10 s, 30 s or the like. The preset speed is also a speed set in advance, and it may be 150 km/h, 200 km/h, 300 km/h, or the like.

It should be noted that if the system message of the serving cell does not carry the cell reselection parameters, it indicates that the serving cell is currently not a cell in the first network. At this time, the cell reselection hysteresis value carried in the system message may be directly determined as the cell reselection hysteresis value in the R criterion.

For example, the first network is a high-speed-railway dedicated network. When the serving cell is a cell in a public LTE network, both of a terminal on a high-speed railway and a terminal not on the high-speed railway can directly determine the cell reselection hysteresis value of the system message of the serving cell as the cell reselection hysteresis value in the R criterion.

When the terminal determines the target cell reselection hysteresis value, it determines the cell reselection hysteresis value in the R criterion. At this time, the terminal can determine the signal quality of the serving cell based on the following formula:

$$R_s = Q_{meas,s} + Q_{Hyst} - Q_{offset_{temp}} + Q_{offset_{SCPTM}}.$$

$R_s$ represents the signal quality of the serving cell; $Q_{meas,s}$ represents the signal quality of a reference signal of the serving cell; $Q_{Hyst}$ is a cell reselection hysteresis value that is set to prevent the terminal from frequently carrying out ping-pong reselection in two cells close to each other; in addition, $Q_{offset_{temp}}$ and $Q_{offset_{SCPTM}}$ represent the temporary signal quality defined in the protocol and the reference signal quality in the SCPTM technology.

Regarding the implementation mode (2) in step 301, step 303 is implemented by the following sub-steps: determining the terminal's own movement speed; selecting a speed interval corresponding to the movement speed from the at least two speed intervals to obtain a target speed interval; selecting a hysteresis value scaling factor corresponding to the target speed interval from the at least two hysteresis value scaling factors; adding the initial cell reselection hysteresis value and the selected hysteresis value scaling factor together to obtain a target cell reselection hysteresis value; and determining the signal quality of the target cell based on the target cell reselection hysteresis value.

It can be known from step 301 that the hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in a first network; and the hysteresis value scaling factor corresponding to the speed interval of which the value is greater than the preset speed is smaller than 0 and the hysteresis value scaling factor corresponding to the speed interval of which the value is smaller than the preset speed is greater than 0 when the target cell is a cell in a second network.

Therefore, the target hysteresis value scaling factor determined by the terminal is greater than 0 when the current movement speed of the terminal is higher than the preset speed and the serving cell is a cell in the first network. At this time, it is equivalent for the terminal to increasing the initial cell reselection hysteresis value and determining the increased value as the target cell reselection hysteresis value to increase the probability that the terminal resides in the cell of the first network.

The target hysteresis value scaling factor determined by the terminal is smaller than 0 when the current movement speed of the terminal is lower than the preset speed and the serving cell is a cell in the first network. At this time, it is equivalent for the terminal to reducing the initial cell reselection hysteresis value and determining the reduced value as the target cell reselection hysteresis value to reduce the probability that the terminal resides in the cell of the first network.

For example, when the first network is a high-speed-railway dedicated network and the second network is a public LTE network, the probability that a UE on a high-speed railway resides in a cell of the high-speed-railway dedicated network, or the probability that a UE not on the high-speed railway resides in a cell of the public LTE network may be increased in the above manner.

Regarding the implementation mode (3) in step 301, step 303 is implemented by the following sub-steps: determining the terminal's own movement speed; selecting a speed interval corresponding to the movement speed from the at least two speed intervals to obtain a target speed interval; selecting a cell reselection hysteresis value corresponding to the target speed interval from the at least two cell reselection hysteresis values to obtain a target cell reselection hysteresis value; and determining the signal quality of the target cell based on the target cell reselection hysteresis value.

At this time, each cell reselection hysteresis value is positively correlated with the value of the corresponding speed interval when the target cell is a cell in the first network, and each cell reselection hysteresis value is negatively correlated with the value of the corresponding speed interval when the target cell is a cell in the second network.

If the serving cell is a cell in the first network, the higher the current speed of the terminal is, the greater the target reselection hysteresis value determined in the above manner is, to increase the probability that the terminal with a high speed resides in the cell of the first network. That is, the probability that a UE on a high-speed railway resides in a cell of a high-speed-railway dedicated network may be increased when the first network is the high-speed-railway dedicated network.

If the serving cell is a cell in the second network, the higher the current speed of the terminal is, the smaller the target reselection hysteresis value determined in the above manner is, to increase the probability that the terminal with a low speed resides in the cell of the second network. That is, the probability that a UE not on a high-speed railway resides in a cell of a public LTE network may be increased when the second network is the public LTE network.

Scenario II: the target cell is at least one neighbor cell. That is, the base station presets the cell reselection parameters with respect to the cell reselection offset value.

At this time, the system message of any neighbor cell carries the cell reselection parameters including at least two cell reselection offset values, and the at least two cell reselection offset values correspond to at least two speed intervals. Therefore, step 303 may be implemented by the following sub-steps: determining the terminal's own movement speed; selecting a speed interval corresponding to the movement speed from the at least two speed intervals to obtain a target speed interval; determining, based on the target speed interval, a target cell reselection offset value corresponding to each neighbor cell from at least two cell reselection offset values included by cell reselection parameters of each neighbor cell; and determining the signal quality of each neighbor cell based on the target cell reselection offset value corresponding to each neighbor cell.

At this time, each cell reselection offset value is negatively correlated with the value of the corresponding speed interval when the neighbor cell is a cell in a first network; and each cell reselection offset value is positively correlated with the value of the corresponding speed interval when the neighbor cell is a cell in a second network.

For any neighbor cell, if it is a cell in the first network, the higher the current speed of the terminal is, for example, the terminal is currently located on a high-speed railway, the smaller the target cell reselection offset value determined by the terminal is. It can be known from the formulas of the R criterion that the smaller the cell reselection offset value is, the higher the signal quality of the cell is. That is, the higher the current speed of the terminal is, the higher the probability that the terminal resides in the cell of the first network is.

If the neighbor cell is a cell in the second network, the lower the current speed of the terminal is, for example, the terminal is not currently located on a high-speed railway, the smaller the target cell reselection offset value determined by the terminal is. It can be known from the formulas of the R criterion that the smaller the cell reselection offset value is, the higher the signal quality of the cell is. That is, the lower the current speed of the terminal is, the higher the probability that the terminal resides in the cell of the second network is.

Therefore, when the first network is a high-speed-railway dedicated network and the second network is a public LTE network, the probability that a UE on a high-speed railway resides in the high-speed-railway dedicated network, or the probability that a UE not on the high-speed railway resides in the public LTE network may be increased in the above manner.

In step 304, the terminal determines the signal quality of other cells than the target cell in the serving cell and the at least one neighbor cell.

In order to select a suitable cell for residence, it is necessary to determine the signal quality of other cells than the target cell in the serving cell and the at least one neighbor cell after the terminal determines the signal quality of the target cell in step 303.

The system message of the neighbor cell is the same as a system message in the related art when the target cell is the serving cell. That is, the system message of the neighbor cell carries the cell reselection offset value. At this time, the terminal can directly determine the signal quality of each neighbor cell according to the following formula:

$$R_n = Q_{meas,n} - Q_{offset} - Q_{offset_{temp}} + Q_{offset_{SCPTM}}$$

$R_n$ represents the signal quality of the neighbor cell; $Q_{meas,n}$ represents the signal quality of a reference signal of the neighbor cell; $Q_{offset}$ is a cell reselection offset value within a frequency defined in a protocol; in addition, $Q_{offset_{temp}}$ and $Q_{offset_{SCPTM}}$ represent the temporary signal quality defined in the protocol and the reference signal quality in the SCPTM technology.

That is, the terminal directly determines the signal quality of each neighbor cell according to the cell reselection offset value carried in the system message of each neighbor cell when the target cell is the serving cell.

The system message of the serving cell is the same as a system message in the related art when the target cell is at least one neighbor cell. That is, the system message of the serving cell carries the cell reselection hysteresis value. At this time, the terminal can directly determine the signal quality of the serving cell according to the formulas of the R criterion. That is, the terminal directly determines, according to the cell reselection hysteresis value carried in the system message of the serving cell, the signal quality of each neighbor cell when the target cell is at least one neighbor cell.

In step 305, the terminal selects, according to the signal quality of the target cell and the signal quality of other cells, one cell from the serving cell and the at least one neighbor cell for residence.

The terminal can directly select a cell with the best signal quality for residence in step 305 after determining the signal quality of the serving cell and the signal quality of each neighbor cell in steps 302 and 303.

For example, the at least one neighbor cell is a neighbor cell 1, a neighbor cell 2, and a neighbor cell 3. The terminal determines the signal quality of the serving cell and the 3 neighbor cells in steps 302 and 303, and ranks the signal quality of the serving cell and the 3 neighbor cells as follows: the signal quality of the neighbor cell 2>the signal quality of the serving cell>the signal quality of the neighbor cell 1>the signal quality of the neighbor cell 3. At this time, the terminal can directly select the neighbor cell 2 for residence to achieve reselection from the serving cell to the neighbor cell 2.

In the present embodiment, when the target cell is the serving cell and is also a cell in the first network, the terminal determines the signal quality of the serving cell according to the cell reselection hysteresis value and the hysteresis value scaling factor which are included in the cell reselection parameters, instead of directly determining the signal quality of the serving cell by only the cell reselection hysteresis value, so as to increase the probability that the terminal on the high-speed railway resides in the cell of the first network. In addition, the cell reselection parameters of each neighbor cell include at least two cell reselection offset values when the target cell is at least one neighbor cell. Since the at least two cell reselection offset values correspond to at least two speed intervals, the terminal can select a suitable cell reselection offset value according to its own situation, so as to increase the probability that the terminal on the high-speed railway resides in the cell of the high-speed-railway dedicated network.

FIG. 4 is a block diagram of a cell reselection device 400 provided by an embodiment of the present disclosure. The cell reselection device is applied to a terminal, and includes an acquiring module 401, a first determining module 402, a second determining module 403 and a residing module 404 as shown in FIG. 4.

The acquiring module 401 is configured to acquire cell reselection parameters carried in a system message of a target cell. The cell reselection parameters are set according to terminal speeds and the target cell is a serving cell or at least one neighbor cell.

The first determining module 402 is configured to determine the signal quality of the target cell according to the cell reselection parameters.

The second determining module 403 is configured to determine the signal quality of other cells than the target cell in the serving cell and the at least one neighbor cell.

The residing module 404 is configured to select, according to the signal quality of the target cell and the signal quality of other cells, one cell from the serving cell and the at least one neighbor cell for residence.

In one or more embodiments, the target cell is the serving cell and is also a cell in a first network. The cell reselection parameters include an initial cell reselection hysteresis value and a hysteresis value scaling factor. The hysteresis value scaling factor is configured to increase the probability that a terminal of which the speed is higher than a preset speed resides in the first network.

In one or more embodiments, the first determining module 402 is specifically configured to:

determine the terminal's own movement speed;

add the initial cell reselection hysteresis value and the hysteresis value scaling factor together to obtain a target cell reselection hysteresis value when the movement speed is higher than a preset speed, and determine the signal quality of the target cell based on the target cell reselection hysteresis value; and determine the initial cell reselection hysteresis value as a target cell reselection hysteresis value when the movement speed is lower than or equal to the preset speed, and determine the signal quality of the target cell based on the target cell reselection hysteresis value.

In one or more embodiments, the target cell is the serving cell. The cell reselection parameters include an initial cell reselection hysteresis value and at least two hysteresis value scaling factors corresponding to at least two speed intervals. The hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in a first network. The hysteresis value scaling factor corresponding to the speed interval of which the value is greater than the preset speed is smaller than 0 and the hysteresis value scaling factor corresponding to a speed interval of which the value is smaller than the preset speed is greater than 0 when the target cell is a cell in a second network.

In one or more embodiments, the first determining module 402 is specifically configured to:

determine the terminal's own movement speed;

select a speed interval corresponding to the movement speed from the at least two speed intervals to obtain a target speed interval;

select a hysteresis value scaling factor corresponding to the target speed interval from the at least two hysteresis value scaling factors;

add the initial cell reselection hysteresis value and the selected hysteresis value scaling factor together to obtain a target cell reselection hysteresis value; and determine the signal quality of the target cell based on the target cell reselection hysteresis value.

In one or more embodiments, the target cell is the serving cell. The cell reselection parameters include at least two cell reselection hysteresis values corresponding to at least two speed intervals. Each cell reselection hysteresis value is positively correlated with the value of the corresponding speed interval when the target cell is a cell in a first network. Each cell reselection hysteresis value is negatively correlated with the value of the corresponding speed interval when the target cell is a cell in a second network.

In one or more embodiments, the first determining module 402 is specifically configured to:

determine the terminal's own movement speed;

select a speed interval corresponding to the movement speed from the at least two speed intervals to obtain a target speed interval;

select a cell reselection hysteresis value corresponding to the target speed interval from the at least two cell reselection hysteresis values to obtain a target cell reselection hysteresis value; and determine the signal quality of the target cell based on the target cell reselection hysteresis value.

In one or more embodiments, when the target cell is the at least one neighbor cell, acquiring the cell reselection parameters carried in the system message of the target cell includes:

acquiring cell reselection parameters carried in a system message of each neighbor cell to obtain cell reselection parameters of each neighbor cell.

The cell reselection parameters of each neighbor cell include at least two cell reselection offset values corresponding to at least two speed intervals. In the cell reselection parameters of any neighbor cell that is a cell in a first network, each cell reselection offset value is negatively correlated with the value of the corresponding speed interval. In the cell reselection parameters of any neighbor cell that is a cell in a second network, each cell reselection offset value is positively correlated with the value of the corresponding speed interval.

In one or more embodiments, the first determining module 402 is specifically configured to:

determine the terminal's own movement speed;

select a speed interval corresponding to the movement speed from the at least two speed intervals to obtain a target speed interval;

determine, based on the target speed interval, a target cell reselection offset value corresponding to each neighbor cell from at least two cell reselection offset values comprised by cell reselection parameters of each neighbor cell; and determine the signal quality of each neighbor cell based on the target cell reselection offset value corresponding to each neighbor cell.

In one or more embodiments, a frequency corresponding to the serving cell is the same as a frequency corresponding to the at least one neighbor cell.

In the present embodiment, since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed. Thus, the flexibility in carrying out intra-frequency cell reselection by the terminal is improved.

Regarding the device in the foregoing embodiment, the specific manners in which the modules perform operations have been described in detail in the method-related embodiment, and thus, will not be described in detail herein.

Figure 5:
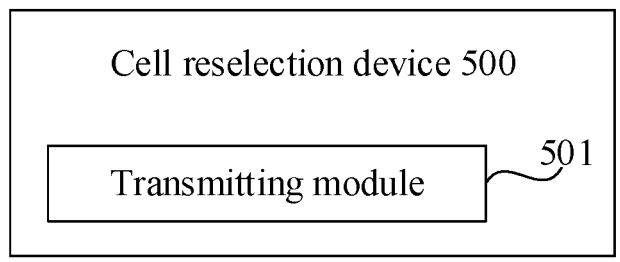
FIG. 5 is a block diagram of another cell reselection device provided by an embodiment of the present disclosure.

FIG. 5 is a block diagram of another cell reselection device 500 provided by an embodiment of the present disclosure. The cell reselection device is applied to a base station, and includes a transmitting module 501 as shown in FIG. 5.

The transmitting module 501 is configured to transmit a system message of a target cell. The system message carries cell reselection parameters that are set according to terminal speeds.

In one or more embodiments, the target cell is a cell in a first network. The cell reselection parameters include an initial cell reselection hysteresis value and a hysteresis value scaling factor. The hysteresis value scaling factor is configured to increase the probability that a terminal of which the speed is higher than a preset speed resides in the first network.

In one or more embodiments, the cell reselection parameters include an initial cell reselection hysteresis value and at least two hysteresis value scaling factors corresponding to at least two speed intervals. The hysteresis value scaling factor corresponding to a speed interval of which the value is greater than a preset speed is greater than 0 and the hysteresis value scaling factor corresponding to a speed interval of which the value is smaller than the preset speed is smaller than 0 when the target cell is a cell in a first network. The hysteresis value scaling factor corresponding to a speed interval of which the value is greater than the preset speed is smaller than 0 and the hysteresis value scaling factor corresponding to a speed interval of which the value is smaller than the preset speed is greater than 0 when the target cell is a cell in a second network.

In one or more embodiments, the cell reselection parameters include at least two cell reselection hysteresis values corresponding to at least two speed intervals. Each cell reselection hysteresis value is positively correlated with the value of the corresponding speed interval when the target cell is a cell in a first network. Each cell reselection hysteresis value is negatively correlated with the value of the corresponding speed interval when the target cell is a cell in a second network.

In one or more embodiments, the cell reselection parameters include at least two cell reselection offset values corresponding to at least two speed intervals. Each cell reselection offset value is negatively correlated with the value of the corresponding speed interval when the target cell is a cell in a first network. Each cell reselection offset value is positively correlated with the value of the corresponding speed interval when the target cell is a cell in a second network.

In one or more embodiments, a frequency corresponding to the serving cell is the same as a frequency corresponding to the at least one neighbor cell.

In the present embodiment, since the cell reselection parameters of the target cell are set according to terminal speeds, the terminal takes its own speed into account when determining the signal quality of the target cell according to the cell reselection parameters. That is, the terminal selects one cell from a serving cell and at least one neighbor cell for residence after considering its own speed. Thus, the flexibility in carrying out intra-frequency cell reselection by the terminal is improved.

Regarding the device in the foregoing embodiment, the specific manners in which the modules perform operations have been described in detail in the method-related embodiment, and thus, will not be described in detail herein.

Figure 6:
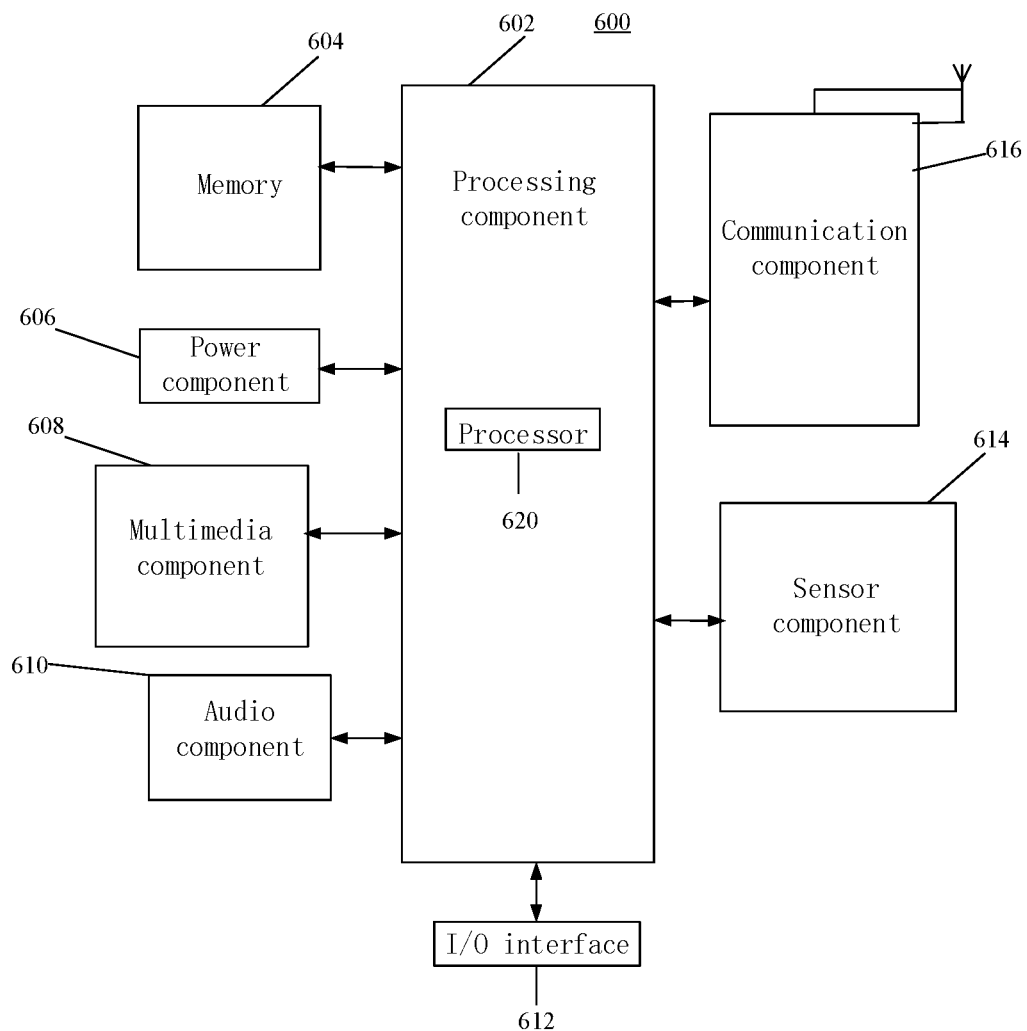
FIG. 6 is a block diagram of yet another cell reselection device provided by an embodiment of the present disclosure.

FIG. 6 is a block diagram of a cell reselection device 600 in accordance with an exemplary embodiment. The device 600 is a terminal, and the terminal may be a mobile phone, a computer, a message transceiver, a gaming console, a table apparatus, a medical apparatus, a fitness apparatus, or the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front camera and/or a rear camera. The front camera and the rear camera may receive external multimedia data while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive external audio signals when the device 600 is in an operation mode, such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, such as a keyboard, a click wheel, buttons, and the like. The buttons may include, but are not limited to, a home button, a volume button, a start button, and a lock button.

The sensor component 614 includes one or more sensors to provide status assessments of various aspects of the device 600. For instance, the sensor component 614 may detect an on/off status of the device 600, relative positioning of components, e.g., the display device and the mini keyboard of the device 600, and the sensor component 614 may also detect a position change of the device 600 or a component of the device 600, presence or absence of user contact with the device 600, orientation or acceleration/deceleration of the device 600, and temperature change of the device 600. The sensor component 614 may include a proximity sensor configured to detect the presence of nearby objects without any physical contact. The sensor component 614 may also include a light sensor, such as a CMOS or CCD image sensor, used for imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In an exemplary embodiment, the communication component 616 receives broadcast signals or broadcast associated information from an external broadcast management system via a broadcast channel. In an exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 604 including instructions, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a terminal, the terminal can be caused to execute the above cell reselection method provided by the embodiments.

An embodiment of the present disclosure provides a computer program product with instructions stored therein. When the computer program product runs on a terminal, the terminal can be caused to execute the above cell reselection method provided by the embodiments.

Figure 7:
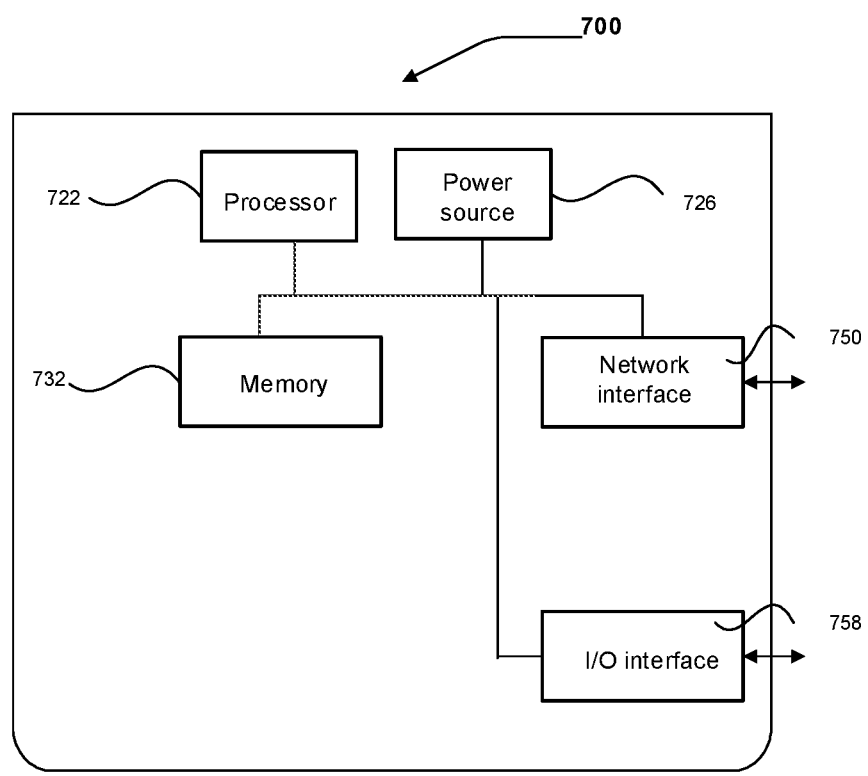
FIG. 7 is a block diagram of yet another cell reselection device provided by an embodiment of the present disclosure.

FIG. 7 is a block diagram of a cell reselection apparatus according to an embodiment of the present disclosure. The apparatus is applied in a base station. With reference to FIG. 7, the apparatus 700 may include a processor 722 including one or more processors and memory resources represented by a memory 732 for storing instructions executable by the processor 722, for example an application program. The application program stored in the memory 732 may include one or more modules, each of which corresponds to a set of instructions. Further, the processor 722 is configured to execute instructions to perform the above cell reselection method provided by the above embodiments.

The apparatus 700 may further include a power source 726 for performing power management for the apparatus 700, a wired or wireless network interface 750 configured for connecting the apparatus 700 to a network, and an input/output interface 758. The apparatus 700 can operate an operating system stored in the memory 732, such as Windows Server™, Mac OS X™, Unix™, Linux™, FreeBSD™ or the like.

In exemplary embodiments, a non-transitory computer readable storage medium including instructions is also provided, such as the memory 732 including instructions, executable by the processor 722 in the apparatus 700, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a base station, the base station can be caused to execute the above cell reselection method provided by the embodiments of the present disclosure.

An embodiment of the present disclosure provides a computer program product including instructions. When the computer program product runs on a base station, the base station can be caused to execute the above cell reselection method provided by the embodiments of the present disclosure.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A cell reselection method, comprising:
   acquiring, by a terminal, one or more cell reselection parameters carried in a system message of a target cell, wherein the one or more cell reselection parameters are set according to speed of the terminal and the target cell is one cell in a plurality of cells comprising a serving cell and at least one neighbor cell;
   determining, by the terminal, signal quality of the target cell according to the one or more cell reselection parameters;
   determining, by the terminal, signal quality of other cells than the target cell in the plurality of cells; and
   selecting, by the terminal, one cell from the plurality of cells for residence according to the signal quality of the target cell and the signal quality of other cells,
   wherein the target cell is the serving cell; the one or more cell reselection parameters comprise an initial cell reselection hysteresis value and at least two hysteresis value scaling factors corresponding to at least two speed intervals;
   when the target cell is a cell in a first network and all values in a speed interval are greater than a preset speed, the hysteresis value scaling factor corresponding to the speed interval is greater than 0; when the target cell is a cell in the first network and all values in a speed interval are smaller than the preset speed, the hysteresis value scaling factor corresponding to the speed interval is smaller than 0; and when the target cell is a cell in a second network and all values in a speed interval are greater than the preset speed, the hysteresis value scaling factor corresponding to the speed interval is smaller than 0; when the target cell is a cell in the second network and all values in a speed interval are smaller than the preset speed, the hysteresis value scaling factor corresponding to the speed interval is greater than 0.

2. The method according to claim 1, wherein the target cell is the serving cell and is also a cell in a first network; the one or more cell reselection parameters comprise an initial cell reselection hysteresis value and a hysteresis value scaling factor; and the hysteresis value scaling factor is configured to increase the probability that the terminal resides in the first network when the speed of the terminal is higher than a preset speed.

3. The method according to claim 2, wherein determining, by the terminal, the signal quality of the target cell according to the one or more cell reselection parameters comprises:
   determining, by the terminal, movement speed of the terminal,
   adding, by the terminal, the initial cell reselection hysteresis value and the hysteresis value scaling factor together to obtain a target cell reselection hysteresis value when the movement speed is higher than the preset speed, and determining, by the terminal, the signal quality of the target cell based on the target cell reselection hysteresis value; and
   determining, by the terminal, the initial cell reselection hysteresis value as the target cell reselection hysteresis value when the movement speed is lower than or equal to the preset speed, and determining, by the terminal, the signal quality of the target cell based on the target cell reselection hysteresis value.

4. The method according to claim 1, wherein determining, by the terminal, the signal quality of the target cell according to the one or more cell reselection parameters comprises:
   determining, by the terminal, movement speed of the terminal;
   selecting, by the terminal, a speed interval corresponding to the movement speed from the at least two speed intervals to obtain a target speed interval;
   selecting, by the terminal, a hysteresis value scaling factor corresponding to the target speed interval from the at least two hysteresis value scaling factors;
   adding, by the terminal, the initial cell reselection hysteresis value and the selected hysteresis value scaling factor together to obtain a target cell reselection hysteresis value; and
   determining, by the terminal, the signal quality of the target cell based on the target cell reselection hysteresis value.

5. The method according to claim 1, wherein the target cell is the serving cell; the one or more cell reselection parameters comprise at least two cell reselection hysteresis values corresponding to at least two speed intervals; each cell reselection hysteresis value is positively correlated with all values of a corresponding speed interval when the target cell is a cell in the first network; and each cell reselection hysteresis value is negatively correlated with all values of a corresponding speed interval when the target cell is a cell in the second network.

6. The method according to claim 5, wherein determining, by the terminal, the signal quality of the target cell according to the one or more cell reselection parameters comprises:
   determining, by the terminal, movement speed of the terminal;
   selecting, by the terminal, a speed interval corresponding to the movement speed from the at least two speed intervals to obtain a target speed interval;
   selecting, by the terminal, a cell reselection hysteresis value corresponding to the target speed interval from the at least two cell reselection hysteresis values to obtain a target cell reselection hysteresis value; and
   determining, by the terminal, the signal quality of the target cell based on the target cell reselection hysteresis value.

7. The method according to claim 1, wherein when the target cell is a cell of the at least one neighbor cell, acquiring, by the terminal, the one or more cell reselection parameters carried in the system message of the one or more target cell comprises:
   acquiring, by the terminal, one or more cell reselection parameters carried in a system message of each neighbor cell to obtain one or more cell reselection parameters of each neighbor cell, wherein
   the one or more cell reselection parameters of each neighbor cell comprise at least two cell reselection offset values corresponding to at least two speed intervals; in the one or more cell reselection parameters of any neighbor cell in the first network, each cell reselection offset value is negatively correlated with all values of a corresponding speed interval; and in the one or more cell reselection parameters of any neighbor cell in the second network, each cell reselection offset value is positively correlated with all values of a corresponding speed interval.

8. The method according to claim 7, wherein determining, by the terminal, the signal quality of the target cell according to the one or more cell reselection parameters comprises:
   determining, by the terminal, movement speed of the terminal;
   selecting, by the terminal, a speed interval corresponding to the movement speed from the at least two speed intervals to obtain a target speed interval,
   determining, by the terminal and based on the target speed interval, a target cell reselection offset value corresponding to each neighbor cell from the at least two cell reselection offset values of each neighbor cell; and
   determining, by the terminal, signal quality of each neighbor cell based on the target cell reselection offset value corresponding to each neighbor cell.

9. A terminal, comprising:
   one or more processors;
   a non-transitory storage coupled to the one or more processors; and
   a plurality of programs stored in the non-transitory storage that, when executed by the one or more processors, cause the terminal to perform acts comprising:
   acquiring one or more cell reselection parameters carried in a system message of a target cell, wherein the one or more cell reselection parameters are set according to speed of the terminal and the target cell is one cell of a plurality of cells comprising a serving cell and at least one neighbor cell;
   determining signal quality of the target cell according to the one or more cell reselection parameters;
   determining signal quality of other cells than the target cell in the plurality of cells; and
   selecting, according to the signal quality of the target cell and the signal quality of other cells, one cell from the plurality of cells for residence,
   wherein the target cell is the serving cell; the one or more cell reselection parameters comprise an initial cell reselection hysteresis value and at least two hysteresis value scaling factors corresponding to at least two speed intervals;

when the target cell is a cell in a first network and all values in a speed interval are greater than a preset speed, the hysteresis value scaling factor corresponding to the speed interval is greater than 0; and when the target cell is a cell in the first network and all values in a speed interval are smaller than the preset speed, the hysteresis value scaling factor corresponding to the speed interval is smaller than 0; and when the target cell is a cell in a second network and all values in a speed interval are greater than the preset speed, the hysteresis value scaling factor corresponding to the speed interval is smaller than 0; and when the target cell is a cell in the second network and all values in a speed interval are smaller than the preset speed, the hysteresis value scaling factor corresponding to the speed interval is greater than 0.

10. The terminal according to claim 9, wherein the target cell is the serving cell and is also a cell in a first network; the one or more cell reselection parameters comprise an initial cell reselection hysteresis value and a hysteresis value scaling factor; and the hysteresis value scaling factor is configured to increase the probability that the terminal resides in the first network when the speed of the terminal is higher than a preset speed.

11. The terminal according to claim 10, wherein determining signal quality of the target cell according to the one or more cell reselection parameters comprises:
determining movement speed of the terminal;
adding the initial cell reselection hysteresis value and the hysteresis value scaling factor together to obtain a target cell reselection hysteresis value when the movement speed is higher than a preset speed, and determining the signal quality of the target cell based on the target cell reselection hysteresis value; and
determining the initial cell reselection hysteresis value as a target cell reselection hysteresis value when the movement speed is lower than or equal to the preset speed, and determining the signal quality of the target cell based on the target cell reselection hysteresis value.

12. The terminal according to claim 9, wherein determining the signal quality of the target cell according to the one or more cell reselection parameters comprises:
determining movement speed of the terminal;
selecting a speed interval corresponding to the movement speed from the at least two speed intervals to obtain a target speed interval;
selecting a hysteresis value scaling factor corresponding to the target speed interval from the at least two hysteresis value scaling factors;
adding the initial cell reselection hysteresis value and the selected hysteresis value scaling factor together to obtain a target cell reselection hysteresis value; and
determining the signal quality of the target cell based on the target cell reselection hysteresis value.

13. The terminal according to claim 9, wherein the target cell is the serving cell; the one or more cell reselection parameters comprise at least two cell reselection hysteresis values corresponding to at least two speed intervals; each cell reselection hysteresis value is positively correlated with all values of a corresponding speed interval when the target cell is a cell in the first network; and each cell reselection hysteresis value is negatively correlated with all values of a corresponding speed interval when the target cell is a cell in the second network.

14. The terminal according to claim 13, wherein determining the signal quality of the target cell according to the one or more cell reselection parameters comprises:
determining movement speed of the terminal;
selecting a speed interval corresponding to the movement speed from the at least two speed intervals to obtain a target speed interval;
selecting a cell reselection hysteresis value corresponding to the target speed interval from the at least two cell reselection hysteresis values to obtain a target cell reselection hysteresis value; and
determining the signal quality of the target cell based on the target cell reselection hysteresis value.

15. The terminal according to claim 9, wherein when the target cell is a cell of the at least one neighbor cell, acquiring the one or more cell reselection parameters carried in the system message of the target cell comprises:
acquiring one or more cell reselection parameters carried in a system message of each neighbor cell to obtain one or more cell reselection parameters of each neighbor cell, wherein
the one or more cell reselection parameters of each neighbor cell comprise at least two cell reselection offset values corresponding to at least two speed intervals; in the one or more cell reselection parameters of any neighbor cell in the first network, each cell reselection offset value is negatively correlated with all values of a corresponding speed interval; and in the one or more cell reselection parameters of any neighbor cell in the second network, each cell reselection offset value is positively correlated with all values of a corresponding speed interval.

16. The terminal according to claim 15, wherein determining the signal quality of the target cell according to the one or more cell reselection parameters comprises:
determining movement speed of the terminal;
selecting a speed interval corresponding to the movement speed from the at least two speed intervals to obtain a target speed interval;
determining, based on the target speed interval, a target cell reselection offset value corresponding to each neighbor cell from the at least two cell reselection offset values of each neighbor cell; and
determining signal quality of each neighbor cell based on the target cell reselection offset value corresponding to each neighbor cell.

17. A base station, comprising:
one or more processors;
a non-transitory storage coupled to the one or more processors; and
a plurality of programs stored in the non-transitory storage that, when executed by the one or more processors, cause the base station to perform acts comprising:
transmitting a system message of a target cell, wherein the system message carries one or more cell reselection parameters that are set according to speed of the terminal,
wherein the target cell is a serving cell: the one or more cell reselection parameters comprise an initial cell reselection hysteresis value and at least two hysteresis value scaling factors corresponding to at least two speed intervals;
when the target cell is a cell in a first network and all values in a speed interval are greater than a preset speed, the hysteresis value scaling factor corresponding to the speed interval is greater than 0: when the target cell is a cell in the first network and all values in a speed interval are smaller than the preset speed, the hysteresis value scaling factor corresponding to the speed interval is smaller than 0; and when the target cell is a cell in a second network and all values in a speed interval are greater than the preset speed, the hysteresis value scaling factor corresponding to the speed interval is smaller than 0; when the target cell is a cell in the second network and all values in a speed interval are smaller than the preset speed, the hysteresis value scaling factor corresponding to the speed interval is greater than 0.

18. The base station according to claim 17, wherein the target cell is a cell in a first network; the one or more cell reselection parameters comprise an initial cell reselection hysteresis value and a hysteresis value scaling factor; and the hysteresis value scaling factor is configured to increase the probability that the terminal resides in the first network when the speed of the terminal is higher than a preset speed.

* * * * *